United States Patent [19]

Wysong

[11] 4,206,101

[45] Jun. 3, 1980

[54] MELT EXTRUDABLE COLD WATER-SOLUBLE FILMS

[75] Inventor: Robert D. Wysong, Talleyville, Del.

[73] Assignee: E. I. Du Pont de Nemours and Company, Wilmington, Del.

[21] Appl. No.: 972,960

[22] Filed: Dec. 26, 1978

Related U.S. Application Data

[63] Continuation of Ser. No. 739,280, Nov. 5, 1976, abandoned, which is a continuation-in-part of Ser. No. 525,446, Nov. 20, 1974, abandoned, which is a continuation-in-part of Ser. No. 430,554, Jan. 3, 1974, abandoned.

[51] Int. Cl.$^2$ .................. C08L 29/04; C08L 71/02
[52] U.S. Cl. .................. 260/23 R; 106/287.26; 260/28.5 R; 260/33.2 R; 260/33.4 R; 260/42.37; 264/185; 525/58
[58] Field of Search ............. 260/29.6 B, 29.6 WA, 260/29.6 WB, 33.2 R, 33.4 R, 874, 23 R, 28.5 R; 264/185; 106/287.26

[56] References Cited

U.S. PATENT DOCUMENTS

| | | | |
|---|---|---|---|
| 2,949,697 | 8/1960 | Robertson | 260/29.6 B |
| 3,157,611 | 11/1964 | Lindemann | 260/29.6 B |
| 3,374,195 | 3/1968 | Bianco et al. | 260/33.4 R |
| 3,510,542 | 5/1970 | Strand | 260/29.6 WA |
| 3,882,196 | 5/1975 | Hanke | 260/33.4 R |

FOREIGN PATENT DOCUMENTS

| | | | |
|---|---|---|---|
| 678521 | 1/1964 | Canada. | |
| 44-28588 | of 1969 | Japan | 260/33.4 R |
| 557218 | 11/1943 | United Kingdom | 106/165 |
| 1330745 | 9/1973 | United Kingdom. | |

OTHER PUBLICATIONS

"Carbowax," Union Carbide Chemicals Co., 1959, p. 6.
"Nonionic Surfactants," Edited by Martin J. Schiek, 1967, Marcel Dekker, Inc., New York, p. 1065.
Kirk–Othmer, Encyclopedia of Chemical Technology, Second Edition, vol. 17, 1966, pp. 406 & 651-660.
"The Condensed Chemical Dictionary," Eighth Edition, 1971, pp. 706 & 710.

*Primary Examiner*—Allan Lieberman

[57] ABSTRACT

Films, 0.5–10 mils thick, which are rapidly and completely soluble in cold water, and which are suitable for use as packaging film in automatic packaging equipment, can be prepared by conventional melt extrusion processes when prepared from a novel composition consisting essentially of 5–20 parts by weight of a polyethylene glycol (having an average molecular weight in the range between 325 and 550) in 100 parts by weight of a partially hydrolyzed low molecular weight polyvinyl alcohol.

16 Claims, No Drawings

MELT EXTRUDABLE COLD WATER-SOLUBLE FILMS

CROSS-REFERENCE TO RELATED APPLICATIONS

This is a continuation of application Ser. No. 739,280, filed Nov. 5, 1976, now abandoned which in turn is a continuation-in-part of my application Ser. No. 525,446, filed Nov. 20, 1974, now abandoned which in turn is a continuation-in-part of may application Ser. No. 430,554, filed Jan. 3, 1974, now abandoned.

BACKGROUND OF THE INVENTION

Many commonly used chemicals are produced and sold in pulverulent form, but are then slurried, dispersed, or dissolved in water when used by the consumer. Examples of these materials are pesticides (specifically insecticides, herbicides, nematicides, and fungicides, and the like) which are applied as a water spray, cleaning products (such as laundry detergents, bleaches, and caustic cleansers) which are dissolved in wash water, process chemicals (such as carbon black and activated charcoal) which can be slurried in water, and pigments and dyes which are dissolved or dispersed.

There are several problems associated with the use of these types of products. The first of these problems is exposure of the user and his immediate surroundings to the chemical. Opening a package of finely ground material, measuring an amount of the material, and transferring the measured amount from the package to the equipment where the material is contacted with water can generate airborne dust which contacts the user and contaminates the area. A pesticide dust could be irritating to the eyes and mucous membranes of the nose and throat of the user. A herbicide dust could damage plants in the area where the packages are opened. Dusts of pigments or activated charcoal present severe clean-up problems.

The second problem in using common pulverulent chemicals is accuracy of measurement. Clearly, overcharging of expensive materials is costly. Use of a weak solution of a herbicide will not properly control the undesired plant species. Use of too strong a solution of the same material may damage some desired plants as well as the undesired weeds. It is frequently extremely difficult to accurately measure materials which have become compacted and/or lumpy and to transfer powdery materials in areas exposed to wind.

Finally, after the chemical has been used, the user is faced with the problem of disposing of the package in which the chemical was delivered. It may contain residual amounts of a material which is a pollution problem, potentially hazardous to humans, harmful to plants and animals, or merely unpleasant and unsightly.

Currently available water-soluble films and packages possess one or more of a variety of deficiencies such as the following:

(a) Many films which are characterized as water soluble dissolve slowly or dissolve incompletely in cold water, resulting in the formation of gel-like particles. These particles tend to deposit on vessel walls, piping, pumps, and valves and restrict or prevent flow through screens and nozzles. The melt-extrudable films of this invention are rapidly and completely soluble in water at temperatures as low as 4° C. and do not form gel-like particles of undissolved or partially dissolved polymer.

(b) Many of the compositions utilized in the preparation of such films possess physical properties which are such that large, expensive, highly energy consuming and technologically complex process equipment for film manufacture, e.g., solvent-casting (or doctor knife or bandcasting) is required. A typical solvent-casting process involves dissolving the composition in a suitable solvent (e.g., water), spraying or pouring and spreading the composition on a moving belt, drying the composition, generally, by evaporation of the excess solvent, stripping the dried film from the moving belt and then cutting or shaping into the desired form. The technological complexity of such a process is self-evident. Also that process equipment performing so many steps would be large and expensive is equally clear. However, in consideration of current costs and availability of energy, perhaps even more significant is that a process step involving drying by evaporation of large quantities of water will require the expenditure of enormous amounts of energy.

Preferable to such preparation methods is melt extrusion. Melt-extrusion process equipment compared to the equipment used in water casting, is extremely small, inexpensive, technologically simple, and consumes very little energy.

(c) Many water-soluble films of the prior art possess physical properties which make the film unsuitable for use in packaging quantities of pulverulent materials in the range of one half to ten pounds (e.g. yield strength, tear resistance, toughness, flexibility). Such films are also unsuitable for use in automatic packaging machinery.

(d) The constituents of many of the water-soluble packaging films currently available are numerous, difficult to obtain, and/or expensive.

(e) Examples of prior art teachings include Japanese Pat. No. 28,588/69, U.S. Pat. No. 3,374,195, and its divisional U.S. Pat. No. 3,413,229, and United Kingdom Pat. No. 1,330,745.

The Japanese Patent teaches that a melt-extrudable water-soluble film can be made from a polyvinyl alcohol having viscosity of 18 cps±2 and any of many polyols. Certain draw and melt temperature restrictions are taught. These films include many which are not rapidly water soluble, many which exude upon melt extruding, and many which are not suitable as water-soluble packaging film.

U.S. Pat. No. 3,374,195 teaches an aqueous cast film which is hot or cold water soluble. The film consists of PVA and a combination of two plasticizers, which is a polyethylene glycol of mw 200–600 and hydroxypropyl glycerine. This patent does not teach that the composition is melt extrudable and does teach hydroxypropyl glycerine as a necessary coplasticizer.

The United Kingdom Patent teaches an aqueous cast film which is hot or cold water soluble. The film consists of PVA and a combination of polyvinyl pyrrolidone and an optional plasticizer. This patent does not teach that the composition is melt extrudable and does teach polyvinyl pyrrolidone as a necessary constituent.

SUMMARY OF THE INVENTION

Compositions consisting essentially of 5–20 parts by weight of a polyethylene glycol with an average molecular weight of about 325–550 (based upon measurement of the hydroxyl content thereof obtained by esterification of the glycol with phthalic anhydride/pyridine—page 28 of "Carbowax ® Polyethylene Glycols", Bulletin F-4772G, 1/72-IOM, of Union Carbide Corporation) in 100 parts by weight of a polyvinyl alcohol which is 85–90 mol% hydrolyzed (dry basis, determined by saponification, e.g. with KOH) and has a viscosity of 3–10 cps as measured on a 4% aqueous solution at 20° C., have been found suitable for preparing by conventional melt extrusion process films 0.5–10 mils (1 mil=0.0254 mm.) thick of the same composition, which are rapidly and completely soluble in cold water, and which are suitable for use as packaging film in automatic packaging equipment.

Suitable compositions can be made from commercially available polyvinyl alcohol and polyethylene glycol which are each comparatively inexpensive.

The films can be used to package pulverulent materials. The film package containing the pulverulent material can be directly charged to water, thus eliminating the problems of user contact, exact measuring, and container disposal.

The films also pass the Standard Tests taught in the specification.

DETAILED DESCRIPTION OF THE INVENTION

As used herein the term "film" is intended to mean single layer structures, and excludes laminates. Only low molecular weight (viscosity of about 3–10 cps as measured on a 4% aqueous solution at 20° C. by the Hoeppler falling ball method ASTM-D 1343-56 Part 8, 1958, page 486) polyvinyl alcohol is suitable. Medium or high molecular weight polyvinyl alcohols result in films which are not practical to extrude, and/or fail at least one of the Standard Tests. In addition, the polyvinyl alcohol must be only partially hydrolyzed to a degree of 85–90 mol%. The polyvinyl alcohol can be prepared from polyvinyl acetate by hydrolysis in which acetate groups are replaced by hydroxyl groups to the desired percentage.

Concerning the glycols, only polyethylene glycol having an average molecular weight range of about 325–550 is suitable. Using polyethylene glycols of lower or higher molecular weights, such as the commercially available PEG 300 and PEG 600, results in compositions which fail one or more of the Standard Tests. Similarly, using glycols such as ethylene glycol, diethylene glycol, triethylene glycol, polypropylene glycol, and glycerol also result in unsatisfactory compositions.

In characterizing the polyethylene glycol to be used in the compositions and films of the present invention, an alternative means of identification is by the average degree of polymerization. That is, in characterizing a polyethylene glycol of the formula

HO(CH$_2$CH$_2$O)$_n$H n is the degree of polymerization. Whether the polyethylene glycol is characterized by average molecular weight or by degree of polymerization, when a particular molecular weight or degree of polymerization is specified, it is meant to include materials which are predominantly, but not necessarily entirely, of the specified average molecular weight or the specified degree of polymerization. For example, small quantities of lower and higher molecular weight materials can be present. A typical molecular weight distribution of polyethylene glycols is shown for Union Carbide's Carbowax ® 400 in the bulletin, "Carbowax Polyethylene Glycols," page 22, F-4772G, 1/72-10 M. Polyethylene glycols having average degrees of polymerization of 7–12 are suitable for the compositions of the present invention.

Proper proportioning of the two components is imperative. Use of less than 5 parts by weight of the polyethylene glycol per 100 parts of the partially hydrolyzed polyvinyl alcohol results in a composition which is no longer rapidly cold water-soluble, which tends to be slow in melt extrusion, and which tends to be brittle as a film. Use of more than 20 parts by weight of the polyethylene glycol per 100 parts of the partially hydrolyzed polyvinyl alcohol results in a composition which has an adequate extrudability rate, but which exhibits an unacceptable degree of exudation, i.e., the polyethylene glycol is at least partially rejected by the polyvinyl alcohol, resulting in a slimy coating of the film.

These films can be prepared at commercial rates using conventional melt extrusion apparatus such as is commonly used in the preparation of polyethylene, polypropylene, or polyvinyl chloride films. The novel composition of the present invention in the form of powder, granules, or pellets is melted, extruded through a slit or annulus, quenched by air and then drawn down and/or blown to form a thin film. Such stretching can impart orientation to the film.

PREFERRED EMBODIMENTS

The most preferred plasticizers because of their commercial availability are polyethylene glycols having an average molecular weight of 380 to 420, for example, Carbowax ® 400—Union Carbide, New York, New York. Other polyethylene glycols believed to be equivalent to Carbowax ® 400 are Poly G ® 400—Olin Chemicals, Stamford, Connecticut, and Gafanol ® E400—GAF Corporation, New York, New York.

Commercially available polyvinyl alcohols, having a viscosity in the range between about 3–10 cps and a degree of hydrolysis of about 85 to 90 mol%, are suitable for this invention. These include Elvanol ® 51-05 (viscosity 4–6 cps, 87.7–89.7 mol% hydrolyzed) Du Pont, Gohsenol ® GL-05 (viscosity 4.8–5.8 cps, 87–89 mol% hydrolyzed) Nippon Gohsei, and Gelvatol ® 20–30 (viscosity 4–6 cps, 85.5–88.7 mol% hydrolyzed) Monsanto.

The preferred relative amounts of the two primary constituents is from 12–17 parts by weight (pbw) of the polyethylene glycol in 100 pbw of the polyvinyl alcohol, with the most preferred embodiment being 15 pbw of the PEG to 100 pbw of the PVA.

Small quantities (≦5 pbw based on 100 pbw PVA; preferably 0.1–2 and most preferred 0.1–1 pbw) of adjuvants commonly used in cellulose, vinyl, or polyolefin films such as antioxidants, release agents, antiblock agents, and slip agents may be incorporated either before or after extrusion, providing the water solubility or other primary properties of the resulting film are not appreciably impaired. For example, the web could be dusted with talc during windup prior to storage or packaging. The following materials are preferably included in the composition prior to extrusion. Inorganic fillers such as clays, silicas (e.g., Cab-o-sil ® L-5 (0.05 microns) or M-5 (0.012 microns) Cabot Corp., Boston, Mass.), alumina, silicates such sodium silicate, lithium polysilicate (Polysilicate ® 85—E. I. du Pont de Nemours and Company, Wilmington, Delaware) or hydrated sodium silico-aluminates (e.g. Zeolex ® 23A, J. M. Huber Corp., New York, New York) can be used. Useful organic materials include among others (1) long chain fatty acids, alcohols, amides, or salts (e.g., stearic acid, stearyl alcohol, erucamide, magnesium or calcium stearate, (2) waxes, (3) partially oxidized low molecular weight polyethylene (e.g., XL-223—American Hoechst), and (4) silicones (e.g., dimethylsilicones).

In addition, small quantities of water-soluble polymers which are partially compatible with the polyvinyl alcohols of the present invention can be advantageously included as coplasticizers, provided the partially compatible polymer constitutes no more than 2 pbw based on 100 pbw PVA. Examples of such partially compatible polymers include polyethers of the formula $-[CH_2CH_2O]_n-$ with a molecular weight of at least 600 which are sometimes referred to as polyethylene glycols and sometimes as polyethylene oxides, polypropylene glycols or polypropylene oxide/ethylene oxide copolymers of at least 400 molecular weight. Polyethylene oxides of molecular weight 500,000–1,000,000 are most preferred. Molecular weights for all such polyethylene glycols, polyethylene oxides and said copolymers are determined as described above.

Further, atmospheric moisture acts as a coplasticizer which toughens the film. In the process for preparing the films of the present invention by melt extrusion, the operting temperature of the equipment result in there being little or no water present in the film as it is first formed. However, as the film leaves the extrusion apparatus, it contacts and begins to equilibrate with the ambient atmosphere commonly containing moisture of from 25–70% relative humidity. The preferred dry basis moisture content of the film before slitting is 4–5%; 5–7% is preferred for the finished film for packaging. The preferred relative humidity range for automatic packaging is from 25–65% with 35–55% being most preferred.

The films of this invention are preferably prepared by blow extrusion, which is particularly useful since biaxial orientation can be achieved during this stretching process. Orientation toughens the film (e.g., in impact strength and tear strength).

The films of the present invention are rapidly (less than one minute per mil thickness) and completely soluble in cold water, i.e., water as cold as 40° F. (4° C.), such as would be available for large scale agricultural use in Spring or Fall. Of course, in warmer water, the rate of dissolution increases. These films are most useful in terms of machinability in automatic packaging equipment and handlability of filled packages. The extruded films are particularly useful for packaging pulverulents on conventional packaging lines, e.g., vertical make-and-fill machines where heat-sealed pillow packs are produced. p The cold water-soluble packaging films of this invention are particularly useful for packaging pulverulent, dusty, noxious, irritating, and/or toxic materials which must be dispersed, slurried, suspended or dissolved in water or mixed solvents, one of which is water. For this reason the film is especially suited for packaging agricultural chemicals. The films of the present invention can also be used in the packaging of liquid substances, such as liquid agricultural formulations which are to be dispersed in water and which are based on water-immiscible and polyethylene glycol a hyphen immiscible oils and hydrocarbons such as cyclohexane, mineral oil, and kerosene. Examples of materials which are usefully packaged in premeasured portions in packages made of the films of the present invention are pesticides (such as insecticides, herbicides, nematicides, and fungicides), cleaning products (such as laundry detergents, bleaches, and caustic products), process chemicals (such as catalysts for polymerizations, carbon black, activated charcoal, pigments, and dyes), foodstuffs, and food additives. Other uses involve preparing premeasured portions of incompatible materials such as flour and oil; benomyl and maneb fungicides; and the like in separate water-soluble film packages and overwrapping these separate packages in a single moistureproof packaging material. When used, the separate water-soluble packages containing the premeasured portions of additive or chemical are added simultaneously to the liquid in suitable mixing equipment, thus preventing premature reaction or mixture and eliminating sources of measuring errors.

In order to protect the water-soluble package during storage, shipping, and handling, a moistureproof overwrap must be provided to prevent damage from atmospheric moisture such as high humidity, rain, and dew and from accidental contact with water by splashing or from wet hands. This moistureproof overwrap can be provided for either individual packages or groups of packages, whichever appears to be most desirable for the individual case. Moistureproofed cartons may be used. Of course, once the overwrap is removed, the soluble packages must be protected from water contact or must be used promptly.

Suitable materials for the overwrap are the polyolefin films such as polyethylene or polypropylene, Kraft paper moistureproofed with polyethylene, moistureproof cellophane, glassine, metal foils, polyester, polyvinyl chloride, polyvinylidene chloride, and combinations of these materials as in laminates. The choice of the overwrap would be dictated by costs and strengths required.

Thus, the compositions of this invention have the following combination of properties: (1) easily fabricated by conventional melt extrusion processes into a film without the necessity of water and without accompanying exusion; (2) the melt-extruded films (a) can be oriented during extrusion to provide varying degrees of toughness, (b) are rapidly and completely cold water-soluble, and (c) are suitable for use in automatic packaging equipment.

The following Examples and Test Procedures further illustrate the present invention. All parts and percentages are by weight unless specified otherwise (pbw=parts by weight).

STANDARD TESTS

I. Composition Constituent Compatibility

This is a test for exudation of the plasticizer from a film under ambient conditions (i.e., 25° C., 25–70% relative humidity).

This test is conveniently performed on a film which has been melt extruded or has been solution cast as follows:

Approximately 30 grams of an aqueous stock solution (10–40%) of the desired polyvinyl alcohol is stirred with the desired amount of neat plasticizer at room temperature with a high speed disc stirrer until the mixture is visually homogeneous. Brief steam heating can be used to aid the mixing. The resulting casting solution is poured onto a 1.91 cm. thick Lucite ® plate and drawn down with a doctor knife having a clearance such that a 1–2 mil film can be stripped from the plate following overnight drying at ambient conditions.

Exudation exists to an undesirable level where a layer of plasticizer is evident by visual inspection of a film upon wiping a cotton swab across its surface.

II. Cold Water Solubility Rate

Each of the following tests is performed on film which has been pre-equilibrated to 25–70% relative humidity for approximately 24 hours.

A. Spray Tank Cold Water Solubility Rate

In general, this test simulates tank conditions in the field. A package of pesticide is dropped into cold water with mild agitation and the pesticide is dispersed. The resulting aqueous dispersion (or solution) is pumped through a fine screen. The screen is then quickly sprayed with a fine mist of a developing dye solution and is inspected for residual gels or pieces of film.

In particular, a 18.9 liter capacity steel spray tank (30.5 cm. diameter by 55.9 cm. high) is insulated and is filled with tap water, and cooled to 4° C. The water is circulated at a rate of about one gallon/minute through a valve at the bottom of the tank, through a centrifugal pump (Eastern Industries, Model D6, Type 215, 1550 RPM, 1–3 amp., 1/30 HP.). and back into the top of the tank. A heat-sealed "pillow pack" prepared from the film under test and containing a pulverulent pesticide is dropped into the tank. A timer is started immediately, and the "break time" (which occurs when the water first enters the pillow pack and contacts the pesticide) and the "release time" (which occurs when the package sinks or when the pesticide begins to disperse and separate from the remains of the package—generally the pesticide drops away from the floating package) are noted.

A steel paddle stirrer (7.62 cm. wide × 1.91 cm. high × 0.32 cm. thick) is driven at 300 RPM. Each minute, a sample of the stream entering the tank is check for gel by passing it through a 50 mesh screen (opening 0.297 mm., wire diameter 0.215 mm.) suspended just above the tank. As soon as this inspection reveals no further gel, the time is noted. This time is considered to be a valid indication of complete dissolution if, upon immediately dumping the entire tank contents through the screen and developing the screen by spraying wtth a saturated aqueous solution of FD&C Blue No. 1, no gel is found. The absence of gel when the entire operation is completed within 10 minutes is considered satisfactory.

B. Film Disc Cold Water Solubility Rate

This is a quick laboratory test which simulates the Spray Tank Cold Water Solubility Rate test described in detail above. The gauge of a 3.18 cm. diameter disc of film 1-2 mils in thickness is measured to the nearest 0.1 mil with a micrometer. A rubber gasket, formed by punching a 2.54 cm. diameter hole in a rubber disc 3.49 cm. in diameter and 0.16 cm. thick, is placed on the film disc and two flat metal rings, the smaller having a 2.54 cm. diameter hole, are used as a frame to clamp the disc tightly. The frame with film mounted therein is placed on a small tripod and a lead shot of 2.00–2.38 mm. diameter is placed on the film disc. This entire rig is lowered into a one liter beaker (the tripod is ½ as high as the beaker) containing 900 ml. of tap water at 4° C., and a timer is started immediately. The "drop time" (when the shot breaks through the film disc) is noted, and a 5.08 cm. magnetic stirring bar is started and maintained at 75 RPM. As soon as visual inspection reveals no further gel or pieces of film, the time is noted. This time is considered to be a valid indication of complete dissolution if, upon immediately pouring the solution through a screen and developing as in the Spray Tank Test, no gel is found. The final solubility rate is reported as minutes/mil for total dissolution. Values less than or equal to one minute/mil are considered satisfactory.

III Melt Extrudability

A. The test instrument used in this test is a Plastometer (Model C, F. F. Slocomb Corp., Wilmington, Delaware) fitted with an orifice 0.8 cm. long and 0.20 cm. in diameter. The piston and weight are 100 and 4900 grams, respectively.

One-half to one gram of the film composition conveniently in the form of film strips (aqueous cast film from Test I) are loaded into the barrel which is preheated to 210° C., and the piston is pushed down by hand to compact the film. Granular or pelletized compositions may also be used, but longer preheat times are required. With a Teflon ® plug set against the orifice, the film composition under test is allowed to preheat for about 7 minutes. The plug is removed and the weight is placed on the piston. As a rod of molten polymer begins to extrude, it is cut off with a spatula, and a stopwatch is started simultaneously therewith.

The newly issuing rod is collected on a polished stainless steel plate positioned 7.62 cm. below the orifice until the rate visually slows or until four minutes elapses. The rod is cut and the watch stopped. The extrudate is weighed and an "extrudability index" is calculated as grams per 10 minutes.

During collection, exudation or evolution of off-gas is noted. The extrudate is examined for exudation or melt fracture on its surface, clarity, color, toughness, and bubbles. Exudation or volatization can also be evidenced by the appearance of a fog of plasticizer on the steel plate.

Compositions exhibiting an extrudability index greater than 1, and which are clear, smooth, tough (as evidenced by bending the rod upon itself without breakage), non-bubbled and non-exuded are considered satisfactory.

B. Self-compatability of the melt extruded composition is determined by storing for 48 hours at 70% relative humidity. Sweaty or wet surfaces on the extrudate are considered indications of exudation at high relative humidity, which is unsatisfactory.

IV Packaging and Handling

A. Nitrogen Flex Test

To determine the ability of a bone dry film to be handled immediately after issuing from a melt extruder without breakage, cast film strips approximately 2.54 cm. × 10.2 cm., are hung overnight at 25° C. in a dry box purged with nitrogen. The strips are then creased in the short direction twice along the same fold. If no shattering or cracks result, the film is considered satisfactory.

B. Heat Sealability

The ability of a film (equilibrated ≧ 2 hours at 27–70% relative humidity) to be formed into packages on an automatic packaging machine is judged using a Sentinel Pacemaker Impulse Heat Sealer (Model 12 TP, Packaging Industries, Hyannis, Massachusetts). The movable upper jaw is equipped with a 0.32 cm. nichrome ribbon.

Both the upper and the bottom jaws are covered with Teflon ®-impregnated glass fabric.

A doubled 2.54 cm.×10.2 cm. strip of film of 1-2 mil thickness is heat sealed at 2.11 kilograms/cm.² with an impulse time of one second or less. If the film does not burn through and tears upon attempting to pull open the seal, the film is satisfactory.

C. Package Drop Test

This test simulates the behavior of an 8 ounce package during storage and rough handling in shipment.

Lead shot (3.36 mm. diameter, 45 grams) is heat sealed in a packet (5.08 cm.×5.08 cm. layflat) formed from water-soluble film (1.5-2.0 mils). The packet is equilibrated at 50-70% RH ($\geq 5$ hours) and then heat sealed in a moistureproof overwrap of 3.5 mil laminate composed of polyethylene/aluminum foil/polyethylene/Kraft paper. The overwrapped package is equilibrated at 0° C. ($\geq 15$ hours) and then quickly dropped 1.22 meters onto a tile floor. Water-soluble packets which remain intact pass the test.

V. Auxiliary Packaging Tests

A. Tensile Properties

Tensile properties and percent elongation are measured on 2.54 cm.×5.08 cm. strips of film using an Instron with a cross head speed of 5.08 cm./minute.

B. Stress Flex

Resistance to flexing under stress is determined by conditioning for 24 hours at a given relative humidity a 10.2 cm.×17.8 cm. film to be tested. Strips which are 2.54 cm. wide are clamped along each of the 17.8 cm. edges between two parallel rubber-faced jaws, 1.27 cm. apart, and in the same plane. The 5.08 cm. width of unclamped film forms a "U" shape between the jaws. The assembly is arranged to rotate the common plane of the jaws at 60 RPM around a center line lying in the plane in the 10.2 cm. direction of the film, and passing through the center of the closed jaws. One jaw is fixed. The second jaw, weighing 681 grams, is arranged to slide freely maintaining parallelism with the 1.27 cm. spacing from the fixed jaw and restrained only by the film under test. Thus, each half revolution of the assembly, the movable jaw moves relative to the fixed jaw, removing the slack from the film specimen being tested, and producing a series of diagonal and parallel wrinkles in the film extending from jaw to jaw. When the plane of the jaws is vertical, a load of 681 grams is applied to the film under test. The sliding jaw applies an initial shock load to the film each half revolution as it slides from one extreme position to the other. Each half revolution is counted as one stress-flex cycle. The test is terminated when the film sample breaks, allowing the movable jaw to strike a switch which interrupts the electrical power used to rotate the assembly.

C. Slip

Ease of slip of the extruded films over rigid surfaces, e.g., a forming collar of a vertical make-and-fill packaging machine, is determined by measuring the kinetic coefficient of friction (C.O.F.) of the film. A 5.08 cm. wide strip of film is placed on a platform driven at 15.2 cm./second. A puck of known weight (200 grams) is placed on the film and attached to a force gauge. The dynamic average force is noted. The C.O.F. is the force value divided by the puck weight; C.O.F. value $\leq 0.3$ are satisfactory. (Coefficient of Friction Tester D-1005, Kayeness, Inc., Downingtown, Pa.)

EXAMPLE 1

POWDERY FEED PREPARATION FOR MELT EXTRUSION

204 Kilograms of a suitable polyvinyl alcohol is charged to a 566 liter ribbon blender. The desired quantity of a suitable polyethylene glycol, neat or as an aqueous solution, is sprayed therein over a period of about 1 to 1½ hours. The inclusion of 5-10 parts by weight of water per 100 parts of polyvinyl alcohol gives a more free flowing composition.

EXAMPLE 2

FLAT DIE; SINGLE SCREW EXTRUSION

Two powdery feeds are prepared as in Example 1 according to the following compositions:

(a)

0, 5, and 10 parts by weight water
10 parts by weight Carbowax ® 400
100 parts by weight Elvanol ® 51-05

(b)

10 parts by weight water
15 parts by weight Carbowax ® 400
100 parts by weight Gohsenol ® GL-05 (Nippon Gohsei, see Polyvinyl Alcohol, Finch, pp. 18-21, 1973, John Wiley & Sons)

and are fed into a Wayne 1.91 cm. single screw extruder equipped with a coathanger flat die having a 5.08 cm. flat slit with a 30 mil gap. Tempertures along the barrel vary from 170°-240° C. (pressure 35.2-70.4 kilograms/cm²) while film is successfully extruded. The extruded films are clean, glossy, nearly colorless, and nearly gel free. No bubbles or exudation are observed. The films are easily drawn down (stretched) to 1 mil thickness by a moving belt.

The films so produced easily pass all of the above-described Standard Tests. The tensile properties of the films when equilibrated and tested at the indicated relative humidities are given in the following table:

TABLE 1

| Comp.-sition | % relative humidity | modulus* | tensile strength* | yield point* | % elongation |
|---|---|---|---|---|---|
| (a) | 35 | 54 | 2.9 | 2.0 | 170 |
| (a) | 50 | 22 | 2.1 | 2.1 | 310 |
| (b) | 35 | 76 | 3.1 | 1.8 | 230 |
| (b) | 50 | 21 | 2.4 | 2.5 | 385 |

*in kilograms/mm

EXAMPLE 3

TWIN SCREW EXTRUSION OR POWDERY FEED

Various powdery feeds are prepared as in Example 1, the compositions of which are summarized in Table 2 below. The feeds are fed into a twin screw melt extruder (Packaging Industries, Inc., Hyannis, Mass.) with a L/D=16:1, a vent in the center and a 66 cm. flat die slit with a 5 mil gap. At 175°-200° C. a colorless, clear, nonexuded film is threaded around chrome-plated driven quench rolls (at room temperature or water cooled), is nipped between rubber rollers and drawn to various thicknesses (0.5-3 mil) by varying the extrusion and windup rates. Extrusion rates of about 27 kilograms per hour (equal to the capacity of the extruder) are achieved with a screw speed of 55 RPM, a wind-up rate of 42.7 meters/min., and thicknesses of 0.5-1.5 mil.

The films so produced easily pass Standard Tests I, II, III, and IV. The properties of the films when equilibrated and tested at the indicated relative humidities are given in the following table:

| Package size (pounds) | film gauge (mils) | Pillow pack dimensions (cm.) | |
|---|---|---|---|
| | | height | layflat width |
| 227 grams | 1.2-1.5 | 14-15.2 | 16.3 |
| 908 grams | 1.5-2.1 | 30.5 | 17.3 |

The 908 grams and 227 grams pillow packs are equili-

TABLE 2
TWIN SCREW EXTRUDED FLAT DIE FILM

| Film Composition | | | MD/TD[6] | | | | | | |
|---|---|---|---|---|---|---|---|---|---|
| 100 PBW PVA | PBW Carbowax® 400 | Relative Humidity % | Modulus[5] | Tensile[5] Strength | Yield[5] Point | % Elongation | No. of Stress Flex Cycles | Slip Coefficient of Friction | Film Disc Water Solubility (minutes) | Spray Tank Cold Water Solubility (minutes) |
| GL-05 | 10 | 20 | | | | | 95/34 | | | |
| 51-05 | 15 | 20 | | | | | 180/57 | | | |
| GL-05 | 10 | 35 | | | | | 162/182 | 0.30[1] | | |
| 51-05 | 15 | 35 | | | | | 249/288 | 0.28[1] | | |
| GL-05 | 10 | 50 | 13/17 | 2.4/2.4 | 2.4/2.4 | 283/384 | | | | |
| 51-05 | 10 | 50 | 12/12 | 2.2/2.2 | 2.2/2.2 | 246/271 | | | | |
| GL-05 | 15 | 50 | 8.4/7.0 | 1.9/1.9 | 1.9/1.9 | 260/259 | | | 0.3-Drop[2] | 0.6-Break[3] |
| 51-05 | 15 | 50 | 9.2/9.8 | 2.0/2.2 | 2.0/2.2 | 278/322 | | | 0.3/mil- | 1.5-Released |
| GL-05 | 10 | 65 | 9.8/10 | 2.1/1.5 | 1.0/1.0 | 243/214 | | 0.25[4] | Complete | 5Complete |
| 51-05 | 15 | 65 | 5.1/4.6 | 1.3/1.2 | 0.8/0.8 | 213/218 | | 0.26[4] | | |

1. Machined metal to film slip
2. Film equilibrated with a relative humidity =58%; film thickness =2 mils
3. Film equilibrated with a relative humidity =58%; film thickness =1.5-1.7 mils; pillow pack =21.6 cm. × 16.5 cm. and contained 454 grams Lannate®90WD
4. Puck covered with Teflon®-impregnated glass cloth tape
5. Kilograms/per square millimeter
6. Machine Direction/Transverse Direction

EXAMPLE 4
SIMULATED FILLED PACKAGE HANDLING

Two pillow packs 1.5-1.8 mils thick, 43.2 cm. and 16.5 cm. wide are made by heat sealing extruded films based on 100 parts Elvanol® 51-05 and based on Gohsenol® GL-05 with 15 parts and 10 parts of Carbowax® 400, respectively. The packs are each filled with five pounds of granulated sugar, sealed, and equilibrated overnight at 45% relative humidity. They are each then dropped onto a tile floor from heights of first 91.4 cm. and then 183 cm. successively without leakage or apparent damage.

A 38.8 cm.×38.1 cm. heat sealed pillow pack, made from 100 parts Elvanol® 51-05/15 parts Carbowax® 400, 1.5 mils thick, containing 4.54 kilograms of granulated sugar is placed in a 11.3 liters fiber pack and dropped 91.4 cm. to the floor with no breakage. The entire intact film package can be conveniently delivered to a spray tank upon up-ending the carton.

Pillow packs containing 227 grams and 908 grams of Lannate® 90WD are produced on an automatic vertical make-and-fill packaging machine using blown film based on 51-05 and on GL-05, each containing 15 pbw of Carbowax® 400. The machine is operated with intermittant motion and effects vertical seals by a constantly heated bar and horizontal seals by impulse with a nichrome ribbon. Production speeds of 15-30 packages per minute are demonstrated.

brated to 50% relative humidity, overwrapped (as per IV (C), and cooled to 10° C. and 0° C., respectively. Both packages survive 122 cm. drops. The same results occur when the overwrapped packages are packed in cardboard cartons (5.45 kilograms per carton), cooled, and the cartons dropped (122 cm.) once on the bottom and once on each of two sides.

EXAMPLE 5
FILLED PACKAGE STORAGE AND SPRAYING

Duplicate pillow packs (6.35 cm. high×7.62 cm. wide) are made from melt-extruded film approximately 1.5 mils thick of 100 parts Elvanol® 51-05/15 parts Carbowax® 400, and are each filled with 10 grams of one of several pesticides (Lannate® 90WD Methomyl Insecticide, Lorox® 50WP Linuron Weed Killer, Manzate® D Maneb Fungicide, Benlate® Benomyl Fungicide, Hyvar® X Bromacil Weed Killer, Tupersan® 50 Siduron Weed Killer, Marlate® 50 Methoxychlor Insecticide, and Thylate® Thiram Fungicide), and placed in moistureproof overwrap envelopes comprised of a polyethylene/aluminum foil/Kraft paper laminate. The envelope is heat sealed and then placed in an oven and maintained at 45° C. for 21 days, thus simulating approximately one year of pesticide storage. Chemical analysis indicates no change in the level of active ingredient during storage. All of the packages are removed from the envelopes easily and pass the spray test. The same results are obtained for pillow packs of Lannate® stored 16 months at room temperature.

Three of the spray tank solutions (Lannate®, Benlate®, and Manzate®) are tested for biological activity and are found to be as active as control solutions of these pesticides.

EXAMPLE 6

COMMERCIAL SCALE BLOWN FILM EXTRUSION

Ribbon blends of each of the following compositions are prepared as in Example 1:

(a)

100 parts Gohsenol ® GL-05 (containing 0 and 5 parts water)
15 parts Carbowax ® 400

(b)

100 parts Gohsenol ® GL-05 (containing 0 and 5 parts water)
20 parts Carbowax ® 400

(c)

100 parts Gohsenol ® GL-05 (containing 0 and 5 parts water)
15 parts Carbowax ® 400
2 parts polyethylene oxide (Polyox ® WRPA 3154, Union Carbide, 900,000 average molecular weight)

Each composition is fed into the twin screw extruder (in Example 3) with a double-holed die about 0.64 cm. diameter. Clear, non-exuded rodding is made and quenched with air knives, with preferred barrel-die temperatures of 190°–210° C. (At melt temperatures of about 200° C., very low pressures develop. Some of the composition (a) is extruded at 130°–180° C.) The rods are cut into pellets, allowed to cool under nitrogen and fed into a 6.35 cm. Eagon melt extruder (Frank W. Eagon & Co.; Bound Brook, N.J.) with a single screw, of a type commonly used in the extrusion of Alathon ® polyethylene. The extruder is equipped with a 25.4 cm. diameter annular die of 25 mil lip opening. The vertically issuing molten tube is cooled by an air ring, inflated by air, collapsed, nipped, and conveyed to the windup section. Collapsed tubing 0.5–5 mils thick, up to 91.4 cm. layflat width is produced at rates up to 54.5 kilograms per hour (about 13.7 meters per minute). In-line slitting, delamination, and windup is performed over a range of about 30–65% relative humidity. The following table summarizes the operating conditions for each of the three compositions.

TABLE 3

| Composition | barrel die temperature °C. | melt temperature °C. | pressure kilograms/mm² |
|---|---|---|---|
| (a) | 185–205 | 200–210 | 2.4 |
| (b) | 165–185 | 185 | 1.4 |
| (c) | 193–200 | 200 | 2.1 |

The resulting films are essentially colorless, non-exuded, non-voided, and contain few gels. Films (a) and (b) are clear. Film (c) is slightly hazy. Film (c) exhibits less tackiness and better slip at high relative humidity, and excellent low temperature (−15° C.) flex. Film properties are given in Table 4.

TABLE 4

BLOWN FILM

| Film Composition | Relative Humidity % | Modulus[1] | Tensile Strength[1] | Yield Point[1] | % Elongation | No. of Stress Flex Cycles | Elmendorf Tear[2] | Film Disc Cold Water Solubility[3] | Spray Tank Cold Water Solubility[3] | Package Drop |
|---|---|---|---|---|---|---|---|---|---|---|
| (a) | 20 | | | | | 216/125 | | | | |
| | 35 | 158/134 | 12/8.4 | | 212/232 | 332/346 | 38/1190 | | 0.3 break 1.0 release <3 complete[4] | |
| | 50 | 11/13 | 3.3/2.1 | | 145/180 | | 0.1 drop[4] | 0.8 min./mil | pass 0° C. | |
| | 62 | | | | | | | | | pass –6° C. |
| (b) | 31 | | | | | | 0.1 drop[5] 0.8 min./mil | | | |
| (c) | 20 | | | | | 116/94 | | | | |
| | 35 | 137/177 | 12/6.3 | | 198/166 | 331/301 | 42/468 | | | |
| | 50 | 11/11 | 2.8/2.1 | 2.8/2.1 | 212/220 | | | | | |

1. in kilograms per square millimeter.
2. in grams per mil; ASTM Method D 1922-61t 1964 Standards, Part 27, p-642
3. minutes
4. 1.4 mils
5. 1.3 mils Table 4 demonstrates that stretch during melt extrusion and windup provides orientation which greatly increases tear strength (compare, e.g., for (a) the 30-fold increase in tear strength for TD vs. MD)—an advantage not obtained via simple solvent casting. The orientation provides other toughness advantages. For example, a filled package comprised of an aqueous cast film (51-05/100 and Carbowax ® 400/15 pbw) was found to fail in the Package Drop Test (0° C., 50% relative humidity).

All of these films pass all of the standard tests and exhibit Film Disc Cold Water Solubility of 0.5–0.8 min.-/mil. A pillow pack of film (a) containing 227 grams of Lannate ® breaks at 0.3 minutes, releases at one minute, and dissolves completely in less than 3 minutes in the Spray Tank Test. Similar results were obtained when the blown film extrusion was repeated using Elvanol ® 51-05 in place of Gohsenol ® GL-05 with 15 pbw of Carbowax ® 400.

EXAMPLE 7

Polyethylene glycol, having an average molecular weight of 330, and Gelvatol ® 20–30 brand of polyvinyl alcohol were used to prepare an aqueous cast film by the procedure given in Stardard Test I. The resulting film (comprised of 100 pbw PVA and 15 pbw of PEG 330) was examined using Standard Tests I through IV, to give the results shown in Table 5.

TABLE 5

| | | STANDARD TESTS | | | | | | | | | | |
|---|---|---|---|---|---|---|---|---|---|---|---|---|
| | I | II | | | | | | III | | IV | | |
| | | −A | | | −B | | | | | | | |
| film gauge (mils) | | break time (min.) | release time (min.) | dump time (min.) | drop time (min.) | total time (min.) | dissoln. rate (min./mil) | physical form | preheat time (min.) | extrudability index | −A | −B |
| 1.5 | pass | 0.3 | 0.7 | 5.0 | 0.6 | 1.3 | 0.9 | aqueous cast film trace of fog on plate | 7 | 14 | pass | pass pass |

Table 5 shows that the film passed all the stardard tests with the exception of a marginal pass in the exudation portion of Test III; i.e. a trace of plasticizer exudation was indicated. That this result is insignificant is shown in the following small scale extrusion using a blend having the same basic ratio of PVA/PEG as above.

A powdery blend was made using the components below by spraying aqueous PEG into the PVA powder, while tumbling in a one-gallon jar:

TABLE 6

| BLEND COMPOSITION | | |
|---|---|---|
| Gelvatol ®20-30 | PEG 330 | WATER |
| 533 g. | 80 g. | 16 g. |

The above blend was fed to a Killion single screw extruder equipped with a one-inch diameter sudden compression Alathon ® type screw (Killion Extruders, Inc., Verona, N.J., L/D 21) and a single hole (3/16-inch diameter) die. Using the conditions below, a clear, light amber rod was successfully extruded onto a conveyer belt and then cut to pellets in-line with the extrusion. The rod occasionally was foamed because of steam venting through the die rather than through the feed throat. No exudation was observed on the die, rod, or take-off belt at any time during the extrusion.

TABLE 7

| Screw | | Pressure | Barrel-die | Melt Temperature |
|---|---|---|---|---|
| RPM | Amps | (p.s.i.) | temperatures (°C.) | (°C.) |
| 23 | 4.0 | low | 160–180 | 205 |

These melt extrusion pelletizing tests demonstrate that PEG 330/PVA is an acceptable composition for the preparation of useful melt-extruded, cold water-soluble film.

EXAMPLE 8

Polyethylene glycol, having an average molecular weight of 533, and Gelvatol ® 20-30 brand of polyvinyl alcohol were used to prepare an aqueous cast film by the procedure given in Standard Test I. The resulting film (comprised of 100 pbw of PVA and 15 pbw of PEG 533) was examined using Standard Tests I through IV to give the results shown in Table 8 (the film passed all of the standard tests).

TABLE 8

| | | STANDARD TESTS | | | | | | | | | | | |
|---|---|---|---|---|---|---|---|---|---|---|---|---|---|
| | I | II | | | | | | III | | IV | | | |
| | | −A | | | −B | | | | | | | | |
| film gauge (mils) | | break time (min.) | release time (min.) | dump time (min.) | drop time (min.) | total time (min.) | dissoln. rate (min./mil) | physical form | preheat time (min.) | extrudability index | −A | −B | −C |
| 1.5 | pass | 0.4 | 1.0 | 6.1 | 0.6 | 1.2 | 0.8 | aqueous cast film no fog on plate | 7 | 10 | pass | pass | pass |

These tests demonstrate that PEG 533/PVA is an acceptable composition for the preparation of useful melt-extruded, cold water-soluble film.

EXAMPLE 9

Extruded Films with Slip Addittives

A. Twin Screw Blown Film

Powdery blends (see Table 9) were prepared in a 3 cu. ft. ribbon blender using the procedure of Example 1, except the slip agents were added to the PVA and tumbled with it initially. These blends were fed to the extruder of Example 3 equipped with a vent port (under partial vacuum) and a two hole die (⅛" diameter holes). The extrusion conditions are given in Table 10.

TABLE 9

| | | | | Slip Agents | |
|---|---|---|---|---|---|
| Blend No. | PVA[1] | Carbowax ®400 | Water | Identity | pbw |
| 1 | 100 | 15 | 5 | XL-223[2] | 0.5 |
| 2 | 100 | 15 | 5 | Carbowax ® 4,000[3] | 1 |
| 3 | 100 | 15 | 5 | cabosil M-5 | 1 |
| 4 | 100 | 15 | 5 | Magnesium Stearate[4] | 0.5 |
| 5 | 100 | 15 | 5 | Sodium silicate[5] | 0.5 |
| 6 | 100 | 15 | 5 | Polysili- | 1 |

TABLE 9-continued

| Blend No. | PVA[1] | Carbowax ®400 | Water | Slip Agents Identity | pbw |
|---|---|---|---|---|---|
|  |  |  |  | cate ®85 |  |

[1]Elvanol ®51-05G by Du Pont
[2]partially oxidized low molecular weight polyethylene of American Hoechst
[3]average molecular weight in the range of 3,000 to 37,000
[4]Fisher Lab Grade
[5]Fisher Technical Grade

TABLE 10

| | Pelletizing Extrusion | | | | | |
|---|---|---|---|---|---|---|
| | Temperatures (° C.) | | | | | |
| Blend No. | Barrel | Die Adapter | Melt | (psi) Pressure | RPM | lb/hr. |
| 1 | 195–210 | 185 | 196 | 125 | 19 | 15 |
| 2 | 189–209 | 182 | 219 | 300 | 14 | 14 |
| 3 | 198–210 | 182 | 201 | 50 | 19 | 11 |
| 4 | 198–210 | 187 | 204 | 50 | 18 | 9 |
| 5 | 187–208 | 181 | 217 | 250 | 14 | 15 |
| 6 | 190–210 | 180 | — | 200 | 14 | — |
| 7 | 196–210 | 187 | 198 | 25 | 18 | 9 |

The rods were conveyed by a conveyer belt, quenched by air knives, and chopped to pellets in-line with the extrusion. The same extruder was then fitted with a 3-7/8 inch diameter circular die (vent of extruder closed) and a screen pack (20/40/60/80/20 mesh), and collapsed tubing (1–3 mils thick, 13–17 inches layflat width) was prepared from the above pellets in accordance with the prodedure of Example 6, using the conditions set forth in Table 11.

TABLE 11

| | Blown Film Extrusion | | | | |
|---|---|---|---|---|---|
| | Temperatures (° C.) | | | | |
| Blend No. | Barrel | Die Adapter | Melt | (psi) Pressure | RPM |
| 1 | 183–199 | 170–181 | 205 | 3800 | 20 |
| 2 | 198–215 | 196–205 | 208 | 2600 | 9 |
| 3 | 190–205 | 178–190 | 210 | 3000 | 19 |
| 4 | 199–203 | 180–188 | 216 | 3700 | 22 |
| 5 | 194–209 | 160–195 | 199 | 2200 | 10 |
| 6 | 190–215 | 160–200 | 193 | — | 11 |
| 7 | 195–200 | 171–188 | 200 | 500 | 17 |

All of the films passed all the standard tests and had improved film-metal slip at 50% relative humidity as measured by Auxillary Test V-C. In addition, Blend 4 film had excellent film-film slip.

B. Commercial Scale Single Screw Blown Film

1. Pelletizing with Plasticizer Injection

The extruder used was a 53 mm twin screw extruder by Werner & Pfleiderer Corporation, Waldwick, N.J. (machine type ZSK 53 L) equipped with five barrel sections. PVA and the slip agent(s), as powdery solids, were delivered by solids feeders to the feed throat. As a polymeric melt was achieved, Carbowax ® 400 was injected into the first barrel section. Steam was vented from ports in the last two barrel sections, and ten rods (3/16″ diameter) emerged from a straight take-off die onto a conveyor belt. The rods were cooled by air knives and a water cooled metal surface, and chopped to pellets in-line with the extrusion. The pellet composition and pelletizing extrusion conditions are given in Table 12.

This is a preferred pelletizing procedure, since dry pellets may be produced at a high rate, and the pre-blending step of plasticizer and PVA is eliminated. This procedure possesses an additional advantage, in that it avoids holes and craters encountered during film extrusion from wet pellets.

TABLE 12

| | Composition (pbw) | | | | Measured Temperature (°C.) | | | | | |
|---|---|---|---|---|---|---|---|---|---|---|
| Composition No. | PVA[1] | Carbowax ®400 | Zeolex ® 23-A | Magnesium[2] stearate | Barrel | Die Adapter | % Torque | RPM | (psi) Pressure | Pellet Rate (lbs./hr) |
| 1 | 100 | 15.6 | 1 | — | 178–210 | 190 | 91 | 270 | 40–75 | 164 |
| 2 | 100 | 14.9–15.6 | 1 | 0.1 | 175–230 | 195–199 | 90 | 270 | 30 | 163 |

[1]Gelvatol ®20-30
[2]U.S.P. grade by Nopco Division of Diamond Shamrock

2. Single Screw Blown Film Extrusion

The above pellets were fed to an MPM 3.5 inch (L/D=20) single-screw extruder by Modern Plastics Machinery. The extruder was equipped with a 60/30 mesh screen pack and a 3 inch diameter annular die (25 mils gap). Collapsed tubing (18 inches layflat width comprised of film 1.5–2 mils thick) was produced and wound in-line in accordance with the procedure of Example 6, using the conditions of Table 13.

TABLE 13

| | Measured Temperature (°C.) | | | | | | |
|---|---|---|---|---|---|---|---|
| Composition No. | Barrel | Die Adapter | Melt | % Load | RPM | Pressure (psi) | Film Rate (lbs/hr.) |
| 1 | 160–204 | 168–191 | 191 | 38 | 26 | 3400 | 84 |
| 2 | 163–204 | 168–191 | 191–193 | 38 | 26 | 3400 | 84 |

These films had exceptional gel-free, wrinkle-free, and smooth surfaces and passed all standard tests. They exhibited excellent packagability on a vertical-form-fill-and-seal packaging machine; the films exhibited excellent slip over the forming collar and forming tube, even at high humidities.

What is claimed is:

1. A composition suitable for use in the preparation of melt-extrudable, cold water-soluble films consisting essentially of 5 to 20 parts by weight of a polyethylene glycol, having an average molecular weight in the range between 325 and 550 (based upon measurement of the hydroxyl content thereof obtained by esterification of said glycol with phthalic anhydride/pyridine), in 100 parts by weight of a low molecular weight polyvinyl alcohol which is about 85 to about 90 mol% hydrolyzed (determined by saponification) and has a viscosity in the range between about 3 and about 10 cps as measured on a 4% aqueous solution at 20° C. (determined by the Hoeppler Falling Ball Method ASTM-D 1343-56, Part 8).

2. The composition of claim 1 wherein said polyethylene glycol is present in an amount in the range between about 12 and about 17 parts per 100 parts by weight of said polyvinyl alcohol.

3. The composition of claim 2 wherein about 15 parts of said polyethylene glycol per 100 parts by weight of said polyvinyl alcohol are present.

4. The composition of claim 1 wherein said polyvinyl alcohol has a viscosity between about 4 and about 6 cps.

5. The composition of claim 1 wherein said polyethylene glycol has an average molecular weight between about 380 and about 420.

6. The composition of claim 5 wherein said polyethylene glycol is present in an amount of 12-17 parts by weight per 100 parts of said polyvinyl alcohol.

7. The composition of claim 6 wherein the viscosity of said polyvinyl alcohol is between about 4 and about 6 cps.

8. The composition of claim 6 wherein said polyethylene glycol is present in an amount of about 15 parts by weight per 100 parts of said polyvinyl alcohol.

9. The composition of claim 8 wherein the viscosity of said polyvinyl alcohol is between about 4 and about 6 cps.

10. The composition of claim 1 containing 2 parts or less by weight per 100 parts of polyvinyl alcohol of a water-soluble polymer, said polymer being selected from polyethers of the formula $-[CH_2CH_2O]_n-$ with a molecular weight of at least 600 which are sometimes referred to as polyethylene glycols and sometimes as polyethylene oxides, polypropylene glycol having an average molecular weight of at least 400, and ethylene oxide/propylene oxide copolymers having an average molecular weight of at least 400.

11. The composition of claim 10 wherein said polymer is a polyethylene oxide with average molecular weight between about 500,000 and about 1,000,000.

12. The composition of claim 1 containing 5 parts or less by weight of an adjuvant per 100 parts by weight of said polyvinyl alcohol, said adjuvant being selected from antioxidants, release agents, anti-block agents, slip agents and fillers.

13. The composition of claim 12 wherein the amount of said adjuvant comprises 0.1 to 2 parts by weight per 100 parts by weight of said polyvinyl alcohol.

14. The composition of claim 12 wherein said adjuvant is a slip agent.

15. The composition of claim 14 wherein said slip agent is selected from calcium stearate, magnesium stearate, hydrated sodium silico-aluminate, and mixtures thereof.

16. The composition of claim 15 wherein said slip agent is a mixture of magnesium stearate and hydrated sodium silico-aluminate.

* * * * *

UNITED STATES PATENT OFFICE
CERTIFICATE OF CORRECTION

PATENT NO. : 4,206,101
DATED : June 3, 1980
INVENTOR(S) : ROBERT D. WYSONG

It is certified that error appears in the above-identified patent and that said Letters Patent are hereby corrected as shown below:

Column 5, line 62, replace "a hyphen" with -- - --.

Column 10, line 54, replace "*in kilograms/mm" with

-- *in kilograms/mm$^2$ --.

Signed and Sealed this

Eleventh Day of November 1980

[SEAL]

Attest:

SIDNEY A. DIAMOND

Attesting Officer

Commissioner of Patents and Trademarks